(12) United States Patent
Pang et al.

(10) Patent No.: US 10,033,580 B2
(45) Date of Patent: Jul. 24, 2018

(54) METHOD, RELATED DEVICE, AND SYSTEM FOR CONFIGURING WIRELESS LOCAL AREA NETWORK DEVICE

(71) Applicant: Huawei Device Co., Ltd., Shenzhen (CN)

(72) Inventors: Gaokun Pang, Shenzhen (CN); Guiming Shu, Shenzhen (CN); Zhiming Ding, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 313 days.

(21) Appl. No.: 14/144,090

(22) Filed: Dec. 30, 2013

(65) Prior Publication Data

US 2014/0112198 A1 Apr. 24, 2014

Related U.S. Application Data

(63) Continuation of application No. PCT/CN2012/080535, filed on Aug. 24, 2012.

(51) Int. Cl.
*H04L 12/24* (2006.01)
*H04W 12/08* (2009.01)
(Continued)

(52) U.S. Cl.
CPC ...... *H04L 41/0806* (2013.01); *H04L 12/2807* (2013.01); *H04L 67/34* (2013.01);
(Continued)

(58) Field of Classification Search
CPC ..... H04W 48/04; H04W 48/08; H04W 48/20; H04W 92/04; H04W 12/00; H04W 12/02;
(Continued)

(56) References Cited

U.S. PATENT DOCUMENTS 8,381,270 B1* 2/2013 Hsieh ................. H04L 41/0806
726/4
2006/0062391 A1* 3/2006 Lee ....................... H04L 63/061
380/270
(Continued)

FOREIGN PATENT DOCUMENTS

CN 1529468 A 9/2004
CN 1925683 A 3/2007
(Continued)

OTHER PUBLICATIONS

IEEE Standard for Information technology—Telecommunications and information exchange between systems—Local and metropolitan area networks—Specific requirements, Part 11: Wireless LAN Medium Access Control (MAC) and Physical Layer (PHY) Specifications, IEEE Std 802.11, IEEE Computer Society, Jun. 12, 2007, 1232 pages.

*Primary Examiner* — Ricky Ngo
*Assistant Examiner* — Stephen Steiner
(74) *Attorney, Agent, or Firm* — Slater Matsil, LLP

(57) ABSTRACT

A method, related device, and system for configuring a wireless local area network device are provided. A configuration device obtains working channel information of a wireless local area network. The working channel information is used to indicate a working channel of the wireless local area network. The configuration device receives a configuration instruction sent by an access point. The configuration instruction is received through the working channel according to the working channel information. The configuration instruction is sent after the access point receives a configuration request of an application terminal, and the configuration instruction is used to instruct the configuration device to send configuration information. The configuration device sends the configuration information through the working channel information, so that the appli- (Continued)

cation terminal performs network configuration with the access point according to the configuration information.

23 Claims, 5 Drawing Sheets

(51) Int. Cl.
    *H04L 29/08*     (2006.01)
    *H04L 12/28*     (2006.01)
    *H04W 88/08*     (2009.01)
    *H04L 29/06*     (2006.01)
    *H04L 12/26*     (2006.01)
    *H04W 8/24*     (2009.01)

(52) U.S. Cl.
    CPC ......... *H04W 12/08* (2013.01); *H04L 41/0813* (2013.01); *H04L 43/10* (2013.01); *H04L 63/0492* (2013.01); *H04L 63/0853* (2013.01); *H04L 2012/2841* (2013.01); *H04W 8/245* (2013.01); *H04W 88/08* (2013.01)

(58) Field of Classification Search
    CPC ..... H04W 12/04; H04W 12/06; H04W 12/08; H04L 63/04; H04L 63/06; H04L 63/08; H04L 63/10; H04L 63/12
    See application file for complete search history.

(56) References Cited

U.S. PATENT DOCUMENTS

| | | | |
|---|---|---|---|
| 2007/0081508 A1* | 4/2007 | Madhavan | H04L 63/0492 370/338 |
| 2008/0045140 A1 | 2/2008 | Korhonen | |
| 2008/0186917 A1 | 8/2008 | Wu et al. | |
| 2010/0034120 A1 | 2/2010 | Nakajima | |
| 2010/0165879 A1* | 7/2010 | Gupta | H04L 12/2807 370/254 |
| 2011/0243115 A1* | 10/2011 | Chen | H04W 8/245 370/338 |
| 2012/0240191 A1* | 9/2012 | Husney | H04W 12/06 370/338 |
| 2013/0309971 A1* | 11/2013 | Kiukkonen | H04L 63/107 455/41.2 |

FOREIGN PATENT DOCUMENTS

| | | |
|---|---|---|
| CN | 101127987 A | 2/2008 |
| CN | 101690334 A | 3/2010 |
| CN | 102137395 A | 7/2011 |
| EP | 2291017 A1 | 3/2011 |
| WO | 2006113884 A2 | 10/2006 |

* cited by examiner

METHOD, RELATED DEVICE, AND SYSTEM FOR CONFIGURING WIRELESS LOCAL AREA NETWORK DEVICE

This application is a continuation of International Application No. PCT/CN2012/080535, filed on Aug. 24, 2012, which is hereby incorporated by reference in its entirety.

TECHNICAL FIELD

The present invention relates to the field of wireless communications and, in particular embodiments, to a method, related device, and system for configuring a wireless local area network device.

BACKGROUND

Since the release of a wireless local area network standard IEEE802.11 in 1997, wireless fidelity (WiFi), driven by the WiFi Alliance formed by leading corporations in industries, has been developing quickly due to its advantages such as fast deployment, ease of use, and high transmission rate. Because notebook computers, tablet computers, mobile phones, and so on all support the WiFi technology, and users have requirements for mobile office, the WiFi technology is widely applied in various industries. Access points of WiFi networks are widely distributed in places such as hotels, cafeterias, schools, and hospitals, and it may be said that WiFi is present everywhere in people's life.

The configuration procedure about how to simply set up a WiFi network at home and then add devices to the wireless network or perform other operations (removing devices) is inconvenient for most users. The WiFi protected setup (WPS) developed by the WiFi Alliance provides simple operation methods to enable users to complete those operations; however, the configuration methods provided by the prior WPS specification have the following problems: high costs, complicated operations, and so on.

Main operations in the prior WPS include setting up an initial wireless network, and adding devices to the wireless network. The WPS architecture includes three parts: an application terminal (enrollee), a registrar, and an access point (AP). The AP is the infrastructure of the wireless local area network, that is, an access point supporting the 802.11 protocol. The registrar is a device for managing the setup of the network and addition/removal of the application terminal. The registrar may be integrated with the access point. An external device such as a mobile phone or a computer may also act as a registrar.

In the prior art, a personal identification number (PIN) identification method may be used to set up a wireless network connection. In actual applications, it is assumed that the following scenario exists. A user has a mobile phone (integrating the roles of an external registrar and an application terminal) and an AP and wants to set up a wireless local area network. After the AP is powered on, the mobile phone may automatically detect the AP and ask the user whether to install the AP. After the user confirms the installation, the mobile phone prompts the user to enter the PIN number of the AP (the PIN is printed on a label attached to the AP). After the user enters the PIN number, a default configuration process is started between devices, and then the mobile phone displays confirmation that the AP is successfully configured. After the initial wireless network is set up, if the user needs to add a wireless printer to the network, after the wireless printer is powered on, the mobile phone detects the new wireless device, and prompts the user whether to add the new wireless device to the network; after the user confirms the addition, the user needs to enter the PIN of the wireless printer into the mobile phone. Then a default configuration process is started between the devices. Finally, both the mobile phone and the wireless printer prompt that the addition is successful.

In the prior art, a user is required to enter the PIN number at the registrar. The user needs to view the label of the device to be added to the network to find the PIN number and enter the PIN number on the user interface of the registrar. The operations in the process of finding the PIN number and entering the PIN number are inconvenient for the user.

SUMMARY OF THE INVENTION

Embodiments of the present invention provide a method for configuring a wireless local area network device, where the method is used for a third-party device to transmit network access configuration information to facilitate user operations.

According to a first aspect, the present invention provides a method for configuring a wireless local area network device. A configuration device obtains working channel information of a wireless local area network. The working channel information is used to indicate a working channel of the wireless local area network. The configuration device receives a configuration instruction sent by an access point. The configuration instruction is received through the working channel according to the working channel information. The configuration instruction is sent after the access point receives a configuration request of an application terminal, and the configuration instruction is used to instruct the configuration device to send configuration information. The configuration device sends the configuration information through the working channel information, so that the application terminal performs network configuration with the access point according to the configuration information.

In a first possible implementation of the first aspect, the working channel information of a wireless local area network is obtained by scanning working channel information of the access point to obtain the working channel information for communication between the access point and the application terminal. Alternatively, or in addition the working channel information of a wireless local area network is obtained by receiving, through a wired interface, the working channel information for communication between the access point and the application terminal which is sent by the access point.

With reference to the first possible implementation of the first aspect, in a second possible implementation, the wired interface includes a universal serial bus USB interface.

With reference to the first possible implementation of the first aspect, in a third possible implementation, the scanning working channel information of the access point specifically includes listening to a beacon frame of the access point, where the beacon frame includes the working channel information of the access point, or sending a probe request frame to the access point, and receiving a probe response frame returned by the access point, where the probe response frame includes the working channel information of the access point.

In a fourth possible implementation of the first aspect, the configuration information includes a configuration key, where the configuration key is used to enable the application terminal to obtain a credential from the access point for setting up a wireless network connection with the access point, a credential for setting up a wireless network connection with the access point.

With reference to the first aspect or any one of the first to the fourth possible implementations of the first aspect, in a fifth possible implementation, the configuration information is sent through the working channel information specifically by sending the configuration information within a preset distance through the working channel information.

With reference to the fifth possible implementation of the first aspect, in a sixth possible implementation, the sending the configuration information within a preset distance through the working channel information includes sending the configuration information with secure power through the working channel information, where the secure power ensures that an effective propagation distance of the configuration information sent by the configuration device is within the preset distance.

With reference to the fifth or sixth possible implementation of the first aspect, in a seventh possible implementation, the preset distance is less than 10 meters.

With reference to the first aspect or any one of the first to the seventh possible implementations of the first aspect, in an eighth possible implementation, the configuration instruction includes configuration time information; and the sending the configuration information through the working channel information includes: sending the configuration information to the application terminal through the working channel information within time indicated by the configuration time information.

With reference to the first aspect or any one of the first to the seventh possible implementations of the first aspect, in a ninth possible implementation, the configuration instruction includes address information of the application terminal; and the sending the configuration information through the working channel information includes sending the configuration information to the application terminal corresponding to the address information through the working channel information by using a unicast message.

According to a second aspect, the present invention provides a method for configuring a wireless local area network device, including receiving, by an access point, a configuration request message sent by an application terminal, and sending, by the access point, a configuration instruction to a configuration device according to the configuration request message, so that the configuration device sends configuration information to the application terminal through a working channel indicated by working channel information, where the configuration information is used for the application terminal to perform network configuration with the access point, and the working channel information is working channel information of a wireless local area network where the access point is located which is obtained by the configuration device.

In a first possible implementation of the second aspect, after the access point receives the configuration request message sent by the application terminal, the method further includes sending a configuration request response message to the application terminal, where the configuration request response message includes configuration time information used to instruct the application terminal to receive, within time indicated by the configuration time information, the configuration information sent by the configuration device.

With reference to the first aspect or the first possible implementation of the first aspect, in a second possible implementation, the configuration instruction includes the configuration information.

With reference to the first aspect or the first possible implementation of the first aspect, in a third possible implementation, after receiving the configuration request message sent by the application terminal, the method further includes sending, by the access point, the working channel information and/or the configuration information to the configuration device through a wired connection.

In a fourth possible implementation of the second aspect, the configuration instruction includes configuration time information, used to instruct the configuration device to send the configuration information within time indicated by the time information; and/or address information of the application terminal, used to instruct the configuration device to send the configuration information to the application terminal corresponding to the address information in unicast mode.

With reference to the second aspect or any one of the first to the fourth possible implementations of the second aspect, in a fifth possible implementation, the configuration information includes a configuration key, where the configuration key is used to enable the application terminal to obtain a credential from the access point for setting up a wireless network connection with the access point or a credential for setting up a wireless network connection with the access point.

According to a third aspect, the present invention provides a configuration device. A channel obtaining unit is configured to obtain working channel information of a wireless local area network. The working channel information is used to indicate a working channel of the wireless local area network. A configuration receiving unit is configured to receive, through the working channel according to the working channel information, a configuration instruction sent by an access point. The configuration instruction is sent after the access point receives a configuration request of an application terminal. The configuration instruction is used to instruct the configuration device to send configuration information. A configuration sending unit is configured to send the configuration information through the working channel information, so that the application terminal performs network configuration with the access point according to the configuration information.

In a first possible implementation of the third aspect, the channel obtaining unit includes a first obtaining module, which configured to scan working channel information of the access point to obtain the working channel information for communication between the access point and the application terminal. A second obtaining module is configured to receive, through a wired interface, the working channel information for communication between the access point and the application terminal which is sent by the access point.

In a second possible implementation of the third aspect, the first obtaining module may be further configured to listen to a beacon frame of the access point, where the beacon frame includes the working channel information of the access point; or send a probe request frame to the access point, and receive a probe response frame returned by the access point. The probe response frame includes the working channel information of the access point.

With reference to the third aspect or either one of the first and the second possible implementations of the third aspect, in a third possible implementation, the configuration sending unit is specifically configured to send the configuration information within a preset distance through the working channel information.

With reference to the third aspect or either one of the first and the second possible implementations of the third aspect, in a fourth possible implementation, the configuration sending unit is further configured to send the configuration information with secure power through the working channel information, where the secure power ensures that an effective propagation distance of the configuration information sent by the configuration device is within a preset distance, and the preset distance is less than 10 meters.

According to a fourth aspect, the present invention provides a configuration device. A request receiving unit is configured to receive a configuration request message sent by an application terminal. An instruction sending unit is configured to send a configuration instruction to a configuration device, so that the configuration device sends configuration information to the application terminal through a working channel indicated by working channel information. The configuration information is used for the application terminal to perform network configuration with the access point. The working channel information is working channel information of a wireless local area network where the access point is located which is obtained by the configuration device.

In a first possible implementation of the fourth aspect, a responding unit is configured to send a configuration request response message to the application terminal after receiving the configuration request message sent by the application terminal, where the configuration request response message includes configuration time information used to instruct the application terminal to receive, within time indicated by the configuration time information, the configuration information sent by the configuration device.

With reference to the third aspect or the first possible implementation of the third aspect, in a second possible implementation, the access point further includes. And information transmitting unit, configured to send the working channel information and/or the configuration information to the configuration device through a wired connection.

It can be seen from the foregoing technical solutions that, the embodiments of the present invention have the following advantages.

In the embodiments of the present invention, a configuration device is used as an intermediate device for transmitting network access configuration information. The configuration device obtains working channel information of a wireless local area network after receiving a configuration instruction sent by an access point, and sends network access configuration information to an application terminal within a preset distance by using the working channel information over a wireless local area network connection, so that the application terminal sets up a wireless network connection with the access point according to the configuration information. In the entire network access process, the user is not required to perform manual search or input configuration information, and it is only necessary to place the configuration device within the distance that can be probed by the application terminal after the configuration device receives the configuration instruction. Therefore, the transmission of configuration information can be completed through the wireless local area network connection, which is convenient and quick.

DETAILED DESCRIPTION OF ILLUSTRATIVE EMBODIMENTS

Embodiments of the present invention provide a method for configuring a wireless local area network device, where the method is used for a third-party device to transmit network access configuration information.

The third-party device herein refers to a device different from an access point and an application terminal in functions in the configuration method of the embodiments of the present invention.

Figure 1:
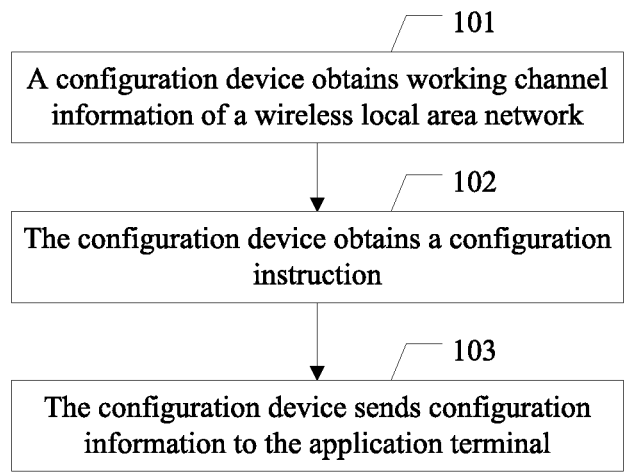
FIG. 1 is a schematic diagram of an embodiment of a method for configuring a wireless local area network device according to the present invention.

In an actual application, if the application terminal needs to enter the wireless local area network, network configuration needs to be performed to obtain a credential for entering the wireless local area network. First, the application terminal sends a configuration request to the access point, so that the access point sends network configuration to the application terminal. In the embodiments of the present invention, a third-party device (configuration device) is introduced. After receiving the configuration request, the access point uses a configuration instruction to instruct the third-party device to send configuration information to the application terminal. Specifically, as shown in FIG. 1, an embodiment of a method for configuring a wireless local area network device in an embodiment of the present invention includes the following steps.

101. A configuration device obtains working channel information of a wireless local area network.

The configuration device obtains working channel information of a wireless local area network, where the working channel information indicates the working channel of the wireless local area network.

The configuration device obtains working channel information of a wireless local area network. The configuration device may obtain the working channel information in multiple manners, and the specific obtaining manner is not limited by the embodiment of the present invention.

102. The configuration device obtains a configuration instruction.

The configuration device obtains the configuration instruction sent by an access point, where the configuration instruction is used to instruct the configuration device to transmit configuration information to an application terminal, so that the application terminal can complete network configuration with the access point according to the configuration information.

103. The configuration device sends configuration information to the application terminal.

The configuration device sends the configuration information by using the working channel information over the wireless local area network, so that the application terminal sets up a wireless network connection with the access point according to the configuration information.

Secure power is set so that the configuration device can send the configuration information to a target application terminal within a target distance and that the leakage of the credential or configuration key in the configuration information can be prevented.

Specifically, the wireless local area network may be a WiFi network. The configuration device in the embodiment of the present invention may be an auxiliary device of the access point, or may be an independent third-party device having a wireless local area network communication function.

In the embodiment of the present invention, a configuration device is used as an intermediate device for transmitting network access configuration information. The configuration device obtains working channel information of a wireless local area network after receiving a configuration instruction sent by an access point, and sends network access configuration information to an application terminal within a preset distance by using the working channel information over a wireless local area network connection, so that the application terminal sets up a wireless network connection with the access point according to the configuration information. In the entire network access process, the user is not required to perform a manual search or input configuration information, and it is only required to place, after the configuration device receives the configuration instruction, the configuration device within the distance that can be probed by the application terminal. Therefore, the transmission of configuration information can be completed through the wireless local area network connection, which is convenient and quick.

Figure 2:
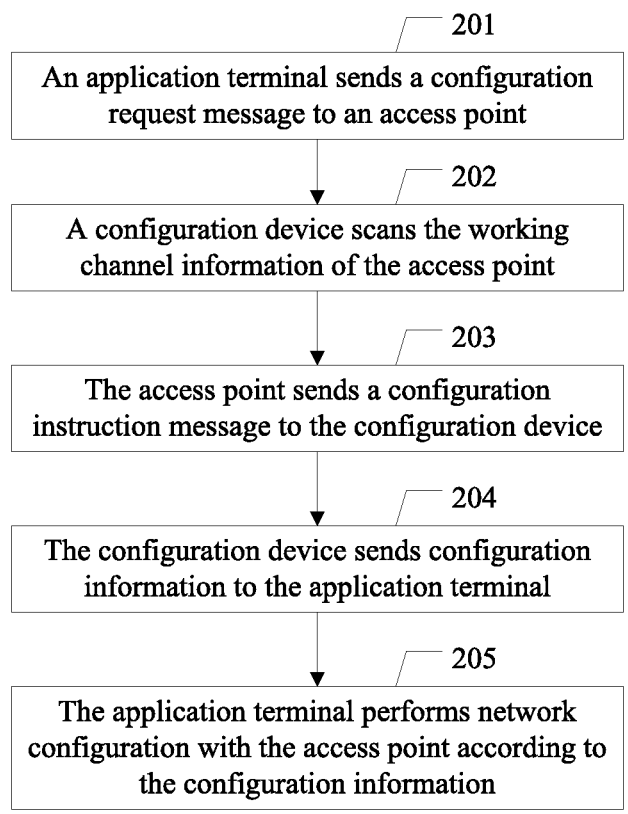
FIG. 2 is a schematic diagram of another embodiment of a method for configuring a wireless local area network device according to the present invention.

In an actual application, a message may be transmitted between an access point and a configuration device through wireless communication. As shown in FIG. 2, another embodiment of a method for configuring a wireless local area network device in an embodiment of the present invention includes the following steps.

201. An application terminal sends a configuration request message to an access point.

An application terminal to be added to the network sends a configuration request message to the access point, where the configuration request message is used to request the configuration information of the access point, so that the application terminal can complete network configuration with the access point according to the configuration information.

In an actual application, the application terminal can search out information of an access point nearby. If the application terminal has not yet been added to the network of the access point, the application terminal sends a configuration request message to the access point, and initiates a procedure for requesting to join the wireless network. The procedure for joining the wireless network is mainly a procedure for the application terminal to obtain the credential of the access point. After obtaining the credential, the application terminal can use the credential to perform authentication with the access point, and after successful authentication, set up a wireless network connection with the access point.

202. A configuration device scans the working channel information of the access point.

Specifically, the working channel information of the wireless local area network includes the working channel information of the access point.

The configuration device scans the working channel information of the access point, and uses the working channel information of the access point as working channel information for communication between the access point and the application terminal.

Alternatively, the configuration device may proactively listen to a beacon frame of the access point, where the beacon frame includes the working channel information of the access point.

Alternatively, the configuration device may also send a probe request frame to the access point, and receive a probe response frame returned by the access point, where the probe response frame includes the working channel information of the access point.

It should be noted that step 201 may be performed before or after step 202.

203. The access point sends a configuration instruction message to the configuration device.

The access point sends a configuration instruction to the configuration device after receiving the configuration request message sent by the application terminal, so that the configuration device transmits the configuration information to the application terminal, where the configuration information is information required for the application terminal to set up a wireless network connection with the access point.

Specifically, the configuration device is an electronic device having a WiFi connection function.

204. The configuration device sends configuration information to the application terminal.

The configuration device sends the configuration information to the application terminal with secure power by using the working channel information over the WiFi network, so that the application terminal sets up a wireless network connection with the access point according to the configuration information.

Secure power is set so that the configuration device can send the configuration information to a target application terminal within the preset distance and that the leakage of the credential or configuration key in the configuration information can be prevented. Specifically, the preset distance may be within 10 meters.

Exemplarily, in an actual application, the user may place the configuration device near to the application terminal, so that the distance between the configuration device and the application terminal is within the effective transmission range of the configuration device, thus completing transmission of the configuration information.

205. The application terminal performs network configuration with the access point according to the configuration information.

The application terminal completes network configuration with the access point according to the configuration information. The specific procedure for setting up a wireless network connection may be determined according to the specific content carried in the configuration information, and is not limited by the embodiment of the present invention.

Figure 3:
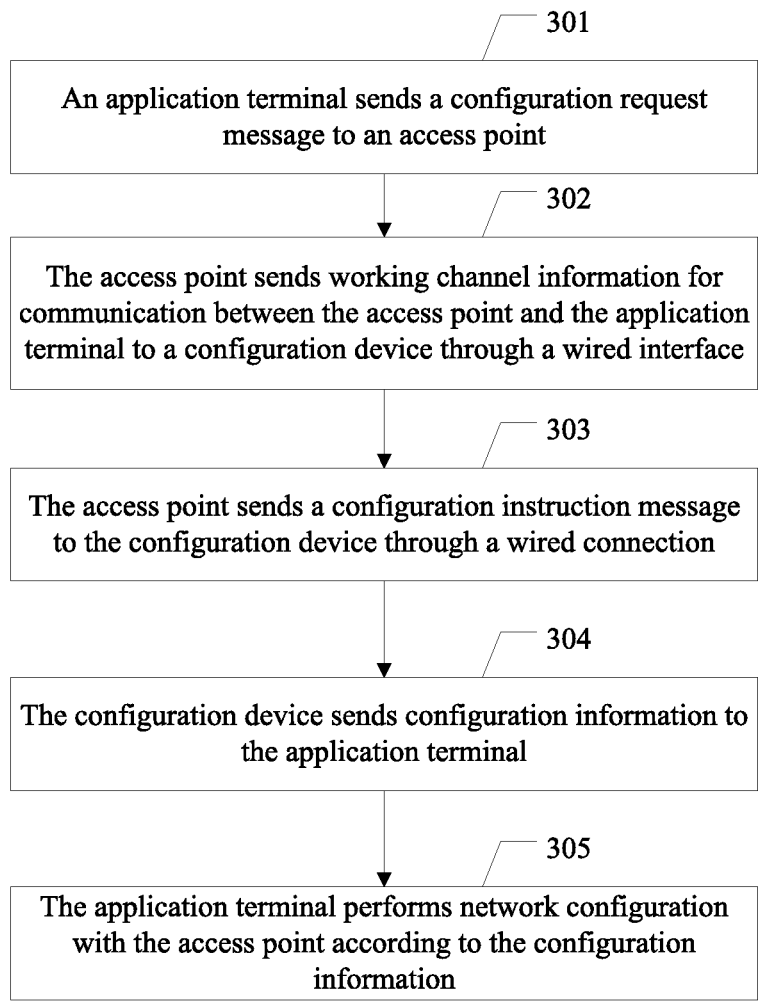
FIG. 3 is a schematic diagram of another embodiment of a method for configuring a wireless local area network device according to the present invention.

In an actual application, the configuration device may implement a static connection with the access point through a wired interface (such as a universal serial bus or USB interface), and the configuration device and the access point can complete transmission of information through the USB interface. Specifically, as shown in FIG. 3, another embodiment of a method for configuring a wireless local area network device in an embodiment of the present invention includes the following steps.

301. An application terminal sends a configuration request message to an access point.

An application terminal to be added to the network sends a configuration request message to the access point, where the configuration request message is used to request the configuration information of the access point, so that the application terminal can set up a wireless network connection with the access point according to the configuration information.

In an actual application, the application terminal can search out information of an access point nearby, send a configuration request message to the access point, and initiate a procedure for requesting to join the wireless network. The procedure for joining the wireless network is mainly a procedure for the application terminal to obtain the credential of the access point. After obtaining the credential, the application terminal can use the credential to perform authentication with the access point, and after successful authentication, set up a wireless network connection with the access point.

302. The access point sends working channel information for communication between the access point and the application terminal to a configuration device through a wired interface.

The access point sends working channel information for communication between the access point and the application terminal to the configuration device through a wired interface.

Alternatively, the working channel information for communication between the access point and the application terminal may be working channel information of the access point.

Alternatively, the wired interface may be a USB interface.

Alternatively, step 302 may occur before the application terminal sends a configuration request message to the access point (for example, pre-configuring the working channel information of the access point), or may also occur after the application terminal sends a configuration request message to the access point, and this is not limited herein; in addition, if step 302 occurs after the application terminal sends a configuration request message to the access point, the configuration device may further obtain more related information of the application terminal (such as the identity of the application terminal) through the access point, so as to correctly transmit configuration information to a target application terminal.

303. The access point sends a configuration instruction message to the configuration device through a wired connection.

After the access point receives the configuration request message sent by the application terminal, if the access point and the configuration device are in the static connection state, the access point may send a configuration instruction message to the configuration device through a USB connection, where the configuration instruction message carries a configuration instruction, so that the configuration device transmits configuration information to the application terminal, where the configuration information is information required for the application terminal to set up a wireless network connection with the access point.

Specifically, the configuration device is a device supporting the WiFi function and capable of short-distance communication. To ensure that the communication distance is the preset distance, the communication distance of the configuration device may be controlled within a certain range by reducing power, adding a power attenuator, or using a special transmission mechanism (such as a radio wave distortion method).

The configuration information may include a key for configuration, abbreviated as a configuration key, where the configuration key may be a bit string of 128 bits or more bits and is hard to be cracked by a malicious attacker. The configuration key may be set in the configuration device fixedly, and the same configuration key is also set in the access point. For example, when the access point and the configuration device are delivered from the factory, the manufacturer sets the same key in the access point and the configuration device. The configuration device may also obtain the configuration key of the access point through a USB connection, that is, the configuration device and access point not paired by the manufacturer may be paired again with respect to the configuration key through a USB connection.

Alternatively, the configuration key may also be carried in the configuration instruction by the access point, that is, the configuration instruction carries configuration information, where the configuration information includes the configuration key. In this way, the configuration key may be always one-time valid.

If the configuration instruction includes configuration information, the configuration information may also include a credential, where the credential usually includes an account name and a key corresponding to the account name. The credential is transferred to only one application terminal, that is, the credential is only one-time valid.

If the configuration instruction includes configuration information, the access point uses a configuration encryption key to encrypt the configuration information, so that the configuration information is sent to the configuration device securely through a WIFI channel. Alternatively, the configuration encryption key may be fixedly preset in the configuration device and the access point, or, the access point sends its own configuration key to the target configuration device through the wireless network.

304. The configuration device sends configuration information to the application terminal.

The configuration device sends the configuration information to the application terminal with secure power by using the working channel information over the WiFi network, so that the application terminal sets up a wireless network connection with the access point according to the configuration information.

The configuration device uses the preset power to send configuration information to the outside, so that the transmission range of the configuration information is within the secure distance, where the secure propagation distance is less than 10 meters. To further ensure security, the propagation distance may be set to 1 meter; for example, generally the application terminal can correctly receive the message sent by the configuration device only within 1 meter. According to the receiver sensitivity −80 dBm specified in the standard, With reference to the path attenuation formula: path_loss=32.5+20*($\log_{10}$(frequency)+$\log_{10}$(dis tan ce)), calculation is performed by using dB as the unit of path loss, GHz as the unit of frequency, and meter as the unit of distance; assuming that the working band is 2.4 GHz, the power is about 0.0001 milliwatt.

Alternatively, the configuration device may send configuration information in unicast or broadcast mode. If the configuration instruction does not carry the identity of the application terminal (specifically, the address information of the application terminal, such as the medium access control address), the configuration device sends the configuration information by broadcast; if the configuration instruction carries the identity of the application terminal, the configuration device may send the configuration information by unicast, and specify that the receiver of the configuration information is the application terminal.

305. The application terminal performs network configuration with the access point according to the configuration information.

Alternatively, if the configuration information includes a configuration key, the application terminal performs the prior WiFi protected setup (WPS) interaction process or other configuration processes with the access point according to the configuration key, and obtains information such as the credential from the access point in the configuration process; and afterwards, uses the obtained credential to complete the wireless network connection with the access point. When the application terminal performs configuration with the access point, the application terminal and the access point use the configuration key to authenticate each other to confirm that the opposite party is correct, and agree upon a temporary key to protect configuration data such as the credential in transmission with participation of the configuration key. The WPS specification specifically describes the configuration process, which is not further described in the present invention.

Alternatively, if the configuration information includes the credential, the application terminal directly uses the credential to complete the wireless network connection with the access point.

Figure 4:
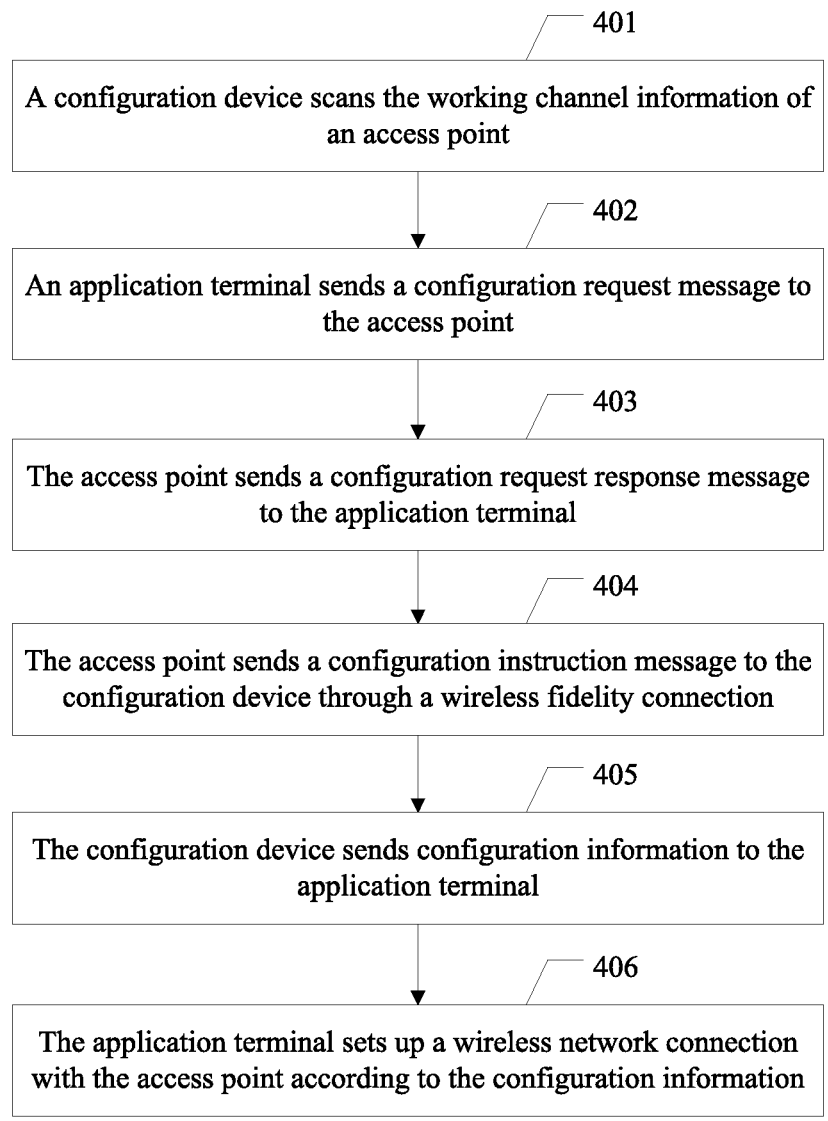
FIG. 4 is a schematic diagram of another embodiment of a method for configuring a wireless local area network device according to the present invention.

In an actual application, if the paired access point and configuration device are in the non-static connection state (namely, the USB connection is broken), the access point may also transmit information to the configuration device through a wireless network (such as the WiFi network). Specifically, as shown in FIG. 4, another embodiment of a method for configuring a wireless local area network device in an embodiment of the present invention includes the following steps.

401. A configuration device scans the working channel information of an access point.

The configuration device scans the working channel information of the access point, and uses the working channel information of the access point as working channel information for communication between the access point and an application terminal. In the embodiment of the present invention, because the configuration device and the access point are in the non-static connection state, while the working channel information of the access point may change, the configuration device may update the working channel information of the access point by scanning.

Alternatively, the configuration device may proactively listen to a beacon frame of the access point, where the beacon frame includes the working channel information of the access point.

Alternatively, the configuration device may also send a probe request frame to the access point, and receive a probe response frame returned by the access point, where the probe response frame includes the working channel information of the access point.

402. An application terminal sends a configuration request message to the access point.

An application terminal to be added to the network sends a configuration request message to the access point, where the configuration request message is used to request the configuration information of the access point, so that the application terminal can set up a wireless network connection with the access point according to the configuration information.

In an actual application, the application terminal can search out information of an access point nearby, send a configuration request message to the access point, and initiate a procedure for requesting to join the wireless network. The procedure for joining the wireless network is mainly a procedure for the application terminal to obtain the credential of the access point. After obtaining the credential, the application terminal can use the credential to perform authentication with the access point, and after successful authentication, set up a wireless network connection with the access point.

403. The access point sends a configuration request response message to the application terminal.

Alternatively, after receiving the configuration request message, the access point may send a configuration request response message to the application terminal, where the configuration request response message is used to instruct the application terminal to receive, within the preset time, the configuration information sent by the configuration device.

404. The access point sends a configuration instruction message to the configuration device through a wireless fidelity connection.

After the access point receives the configuration request message sent by the application terminal, if the access point and the configuration device are in the non-static connection state, the access point may send a configuration instruction message to the configuration device through a WiFi connection, where the configuration instruction message carries a configuration instruction, so that the configuration device transmits configuration information to the application terminal, where the configuration information is information required for the application terminal to set up a wireless network connection with the access point.

Specifically, the configuration device is a device supporting the WiFi function and capable of short-distance communication. To ensure that the communication distance is the preset distance, the communication distance of the configuration device may be controlled within a certain range by reducing power, adding a power attenuator, or using a special transmission mechanism (such as a radio wave distortion method).

The configuration information may include a key for configuration, abbreviated as a configuration key, where the configuration key may be a bit string of 128 bits or more bits and is hard to be cracked by a malicious attacker.

Alternatively, the configuration key may also be carried in the configuration instruction by the access point, that is, the configuration instruction carries configuration information, where the configuration information includes the configuration key. In this way, the configuration key may be always one-time valid.

If the configuration instruction includes configuration information, the configuration information may also include a credential, where the credential usually includes an account name and a key corresponding to the account name. The credential is transferred to only one application terminal, that is, the credential is only one-time valid.

If the configuration instruction includes configuration information, the access point uses a configuration encryption key to encrypt the configuration information, so that the configuration information is sent to the configuration device securely through a WiFi channel. Alternatively, the configuration key may be fixedly preset in the configuration device and the access point, or, the access point sends its own configuration key to the target configuration device through the wireless network.

Alternatively, if the configuration instruction includes configuration time information, the configuration information is sent to the application terminal with the secure power through the working channel information within the time indicated by the configuration time information.

405. The configuration device sends configuration information to the application terminal.

The configuration device sends the configuration information to the application terminal with secure power by using the working channel information over the WiFi network, so that the application terminal sets up a wireless network connection with the access point according to the configuration information.

The configuration device uses the preset power to send configuration information, so that the transmission range of the configuration information is within the secure distance, where the secure propagation distance is less than 10 meters. To further ensure that the distance is secure, the distance may be set to 1 meter. According to the receiver sensitivity (the minimum power value that can be identified by the receiver) −80 dBm specified in the standard, the power is about 0.0001 milliwatt. Alternatively, the configuration device may send configuration information in unicast or broadcast mode. If the configuration instruction does not carry the identity of the application terminal (specifically, the address information of the application terminal, such as the medium access control address), the configuration device sends the configuration information by broadcast. If the configuration instruction carries the identity of the application terminal, the configuration device may send the configuration information by unicast, and specify that the receiver of the configuration information is the application terminal.

406. The application terminal sets up a wireless network connection with the access point according to the configuration information.

Alternatively, if the configuration information includes a configuration key, the application terminal performs the prior WiFi protected setup (WPS) interaction process or other configuration processes with the access point according to the configuration key, and obtains information such as the credential from the access point in the configuration process; and afterwards, uses the obtained credential to complete the wireless network connection with the access point. When the application terminal performs configuration with the access point, the application terminal and the access point use the configuration key to authenticate each other to confirm that the opposite party is correct, and agree upon a temporary key to protect configuration data such as the credential in transmission with participation of the configuration key. The WPS specification specifically describes the configuration process, which is not further described in the present invention.

Alternatively, if the configuration information includes the credential, the application terminal directly uses the credential to complete the wireless network connection with the access point.

Figure 5:
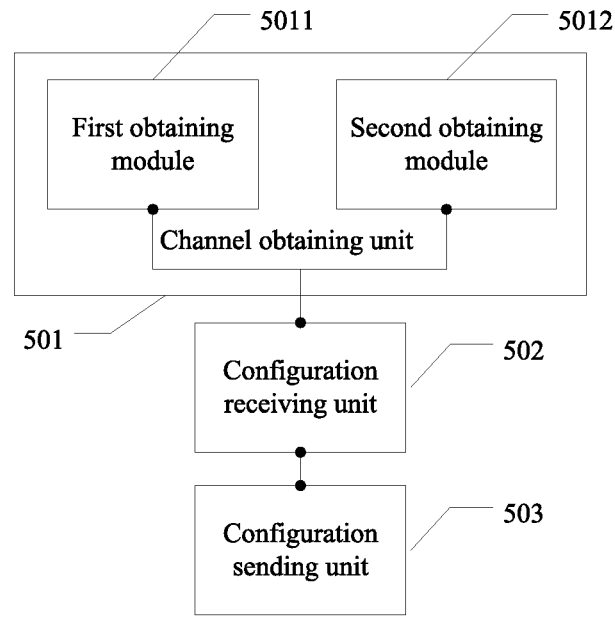
FIG. 5 is a schematic structural diagram of a configuration device according to the present invention.

The following describes an embodiment of a configuration device for executing the method for configuring a wireless local area network device according to the present invention. Referring to the logical structure shown in FIG. 5, an embodiment of the configuration device in an embodiment of the present invention includes a number of units.

A channel obtaining unit 501 is configured to obtain working channel information of a wireless local area network. The working channel information is used to indicate a working channel of the wireless local area network.

A configuration receiving unit 502 is configured to receive, through the working channel according to the working channel information, a configuration instruction sent by an access point. Where the configuration instruction is sent after the access point receives a configuration request of an application terminal. The configuration instruction is used to instruct the configuration device to send configuration information.

A configuration sending unit 503 is configured to send the configuration information through the working channel information, so that the application terminal performs network configuration with the access point according to the configuration information.

Further, the channel obtaining unit 501 in the embodiment of the present invention includes first and second obtaining modules 5011 and 5012. The first obtaining module 5011 is configured to scan working channel information of the access point to obtain the working channel information for communication between the access point and the application terminal. The first obtaining module may be further configured to listen to a beacon frame of the access point. Won frame includes the working channel information of the access point. Alternatively, or in addition, the first obtaining module may be further configured to send a probe request frame to the access point and to receive a probe response frame returned by the access point. The probe response frame includes the working channel information of the access point.

The second obtaining module 5012 is configured to receive, through a wired interface, the working channel information for communication between the access point and the application terminal which is sent by the access point.

Further, the configuration sending unit in the embodiment of the present invention is specifically configured to send the configuration information within a preset distance through the working channel information. Specifically, the configuration sending unit is further configured to send the configuration information with secure power through the working channel information, where the secure power ensures that an effective propagation distance of the configuration information sent by the configuration device is within the preset distance, and the preset distance is less than 10 meters.

The specific interaction process of each unit of the configuration device in the embodiment of the present invention is as follows.

The channel obtaining unit 501 obtains working channel information of the wireless local area network, where the working channel information indicates the working channel of the wireless local area network. Alternatively, the first obtaining module 5011 may scan the working channel information of the access point, and use the working channel information of the access point as working channel information for communication between the access point and the application terminal. The specific operation of the first obtaining module is listening to a beacon frame of the access point, where the beacon frame includes the working channel information of the access point, or sending a probe request frame to the access point and receiving a probe response frame returned by the access point, where the probe response frame includes the working channel information of the access point. The second obtaining module 5012 may also receive, through a wired interface, the working channel information for communication between the access point and the application terminal which is sent by the access point.

Alternatively, the working channel information for communication between the access point and the application terminal may be working channel information of the access point.

Alternatively, the wired interface may be a USB interface.

Alternatively, the access point may send working channel information for communication between the access point and the application terminal to the configuration device through a wired interface before the application terminal sends a configuration request message to the access point (for example, pre-configuring the working channel information of the access point), or after the application terminal sends a configuration request message to the access point, and this is not limited herein; in addition, if the access point sends working channel information for communication between the access point and the application terminal to the configuration device through a wired interface after the application terminal sends a configuration request message to the access point, the configuration device may further obtain more related information of the application terminal (such as the identity of the application terminal) through the access point, so as to correctly transmit configuration information to a target application terminal.

The configuration receiving unit 502 obtains the configuration instruction, where the configuration instruction is used to instruct the configuration device to transmit configuration information to the application terminal, so that the application terminal can complete network configuration with the access point according to the configuration information. The access point sends a configuration instruction to the configuration device after receiving the configuration request message sent by the application terminal, so that the configuration device transmits configuration information to the application terminal, where the configuration information is information required for the application terminal to set up a wireless network connection with the access point.

The configuration sending unit 503 sends the configuration information to the application terminal with secure power by using the working channel information over the WiFi network, so that the application terminal sets up a wireless network connection with the access point according to the configuration information.

Secure power is set so that the configuration device can send the configuration information to the target application terminal within the target distance and that the leakage of the credential or configuration key in the configuration information can be prevented.

Exemplarily, in an actual application, the user may place the configuration device near to the application terminal, so that the distance between the configuration device and the application terminal is within the effective transmission range of the configuration device, thus completing transmission of the configuration information.

The configuration information may include a key for configuration, abbreviated as a configuration key, where the configuration key may be a bit string of 128 bits or more bits and is hard to be cracked by a malicious attacker. The configuration key may be set in the configuration device fixedly, and the same configuration key is also set in the access point. For example, when the access point and the configuration device are delivered from the factory, the manufacturer sets the same key in the access point and the configuration device. The configuration device may also obtain the configuration key of the access point through a USB connection, that is, the configuration device and access point not paired by the manufacturer may be paired again with respect to the configuration key through a USB connection.

Alternatively, the configuration key may also be carried in the configuration instruction by the access point, that is, the configuration instruction carries configuration information, where the configuration information includes the configuration key. In this way, the configuration key may be always one-time valid.

If the configuration instruction includes configuration information, the configuration information may also include a credential, where the credential usually includes an account name and a key corresponding to the account name. The credential is transferred to only one application terminal, that is, the credential is only one-time valid.

If the configuration instruction includes configuration information, the access point uses a configuration encryption key to encrypt the configuration information, so that the configuration information is sent to the configuration device securely through a WiFi channel. Alternatively, the configuration key may be fixedly preset in the configuration device and the access point, or, the access point sends its own configuration key to the target configuration device through the wireless network.

An embodiment of the present invention also provides a computer storage medium, where the computer storage medium is capable of storing a program, which, when executed, includes all or a part of the steps of the method for configuring a wireless local area network device according to the above method embodiments.

Figure 6:
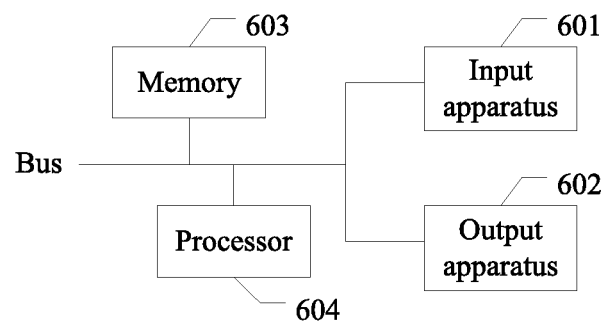
FIG. 6 is a schematic structural diagram of a computer device according to the present invention.

Referring to FIG. 6, an embodiment of the present invention also provides a configuration device, which may include and input apparatus 601, an output apparatus 602, a memory 603, and a processor 604 (the number of processors in the configuration device may be one or more, and one processor is used as an example in FIG. 6). In some embodiments of the present invention, the input apparatus 601, output apparatus 602, memory 603, and processor 604 may be connected through a bus or by other means, and FIG. 6 takes the bus connection as an example.

The processor 604 executes the following steps: obtaining working channel information of a wireless local area network, where the working channel information is used to indicate a working channel of the wireless local area network; receiving, through the working channel according to the working channel information, a configuration instruction sent by an access point, where the configuration instruction is sent after the access point receives a configuration request of an application terminal, and the configuration instruction is used to instruct the configuration device to send configuration information; and sending the configuration information through the working channel information, so that the application terminal performs network configuration with the access point according to the configuration information.

The information stored by the memory 603 includes the configuration instruction, used to instruct the configuration device to transmit configuration information to the application terminal, so that the application terminal can complete network configuration with the access point according to the configuration information.

The beacon frame includes the working channel information of the access point; the probe response frame includes the working channel information of the access point.

The configuration information may include a key for configuration, abbreviated as a configuration key, where the configuration key may be a bit string of 128 bits or more bits and is hard to be cracked by a malicious attacker. The configuration key may be set in the configuration device fixedly, and the same configuration key is also set in the access point. For example, when the access point and the configuration device are delivered from the factory, the manufacturer sets the same key in the access point and the configuration device. The configuration device may also obtain the configuration key of the access point through a USB connection, that is, the configuration device and access point not paired by the manufacturer may be paired again with respect to the configuration key through a USB connection.

Alternatively, the configuration key may also be carried in the configuration instruction by the access point, that is, the configuration instruction carries configuration information, where the configuration information includes the configuration key. In this way, the configuration key may be always one-time valid.

If the configuration instruction includes configuration information, the configuration information may also include a credential, where the credential usually includes an account name and a key corresponding to the account name. The credential is transferred to only one application terminal, that is, the credential is only one-time valid. If the configuration instruction includes configuration information, the access point uses a configuration encryption key to encrypt the configuration information, so that the configuration information is sent to the configuration device securely through a WiFi channel. Alternatively, the configuration key may be fixedly preset in the configuration device and the access point, or, the access point sends its own configuration key to the target configuration device through the wireless network.

In other embodiments of the present invention, the processor 604 may further execute the following steps. The processor 604 may scan working channel information of the access point and using the working channel information of the access point as the working channel information for communication between the access point and the application terminal. In particular, the processor 604 may listen to a beacon frame of the access point. The beacon frame includes the working channel information of the access point. Alternatively, the processor may send a probe request frame to the access point then receive a probe response frame returned by the access point. The probe response frame includes the working channel information of the access point. Or the processor may receive, through a wired interface, the working channel information for communication between the access point and the application terminal which is sent by the access point.

Figure 7:
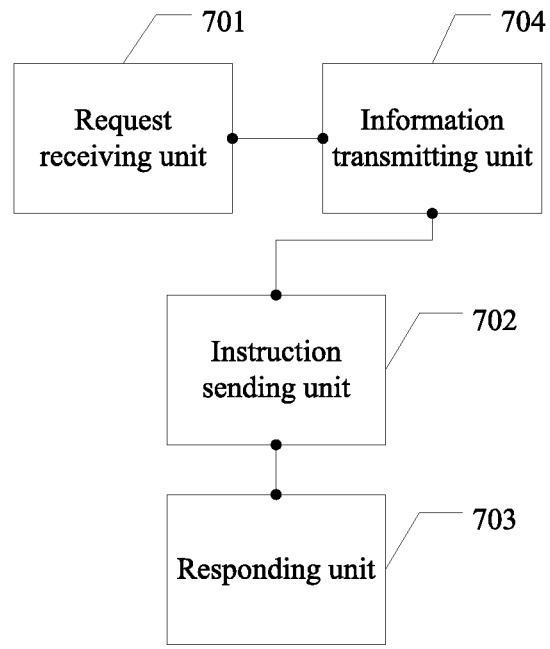
FIG. 7 is a schematic structural diagram of an access point according to the present invention.

The following describes an embodiment of an access point for executing the method for configuring a wireless local area network device according to the present invention. Referring to the logical structure shown in FIG. 7, an embodiment of the access point in an embodiment of the present invention includes a number of additional units. A request receiving unit 701 is configured to receive a configuration request message sent by an application terminal. An instruction sending unit 702 is configured to send a configuration instruction to a configuration device, so that the configuration device sends configuration information to the application terminal through a working channel indicated by working channel information. The configuration information is used for the application terminal to perform network configuration with the access point. The working channel information is working channel information of a wireless local area network where the access point is located which is obtained by the configuration device.

The access point further includes a responding unit 703, which configured to send a configuration request response message to the application terminal after receiving the configuration request message sent by the application terminal. The configuration request response message includes configuration time information used to instruct the application terminal to receive, within time indicated by the configuration time information, the configuration information sent by the configuration device.

The access point further includes an information transmitting unit 704, which configured to send the working channel information and/or the configuration information to the configuration device through a wired connection.

An embodiment of the present invention also provides a computer storage medium, where the computer storage medium is capable of storing a program, which, when executed, includes all or a part of the steps of the method for configuring a wireless local area network device according to the above method embodiments.

Still referring to FIG. 6, an embodiment of the present invention provides a configuration device, which may include and input apparatus 601, an output apparatus 602, a memory 603, and a processor 604 (the number of processors in the configuration device may be one or more, and one processor is used as an example in FIG. 6). In some embodiments of the present invention, the input apparatus 601, output apparatus 602, memory 603, and processor 604 may be connected through a bus or by other means, and FIG. 6 takes the bus connection as an example.

The processor 604 executes the following steps: receiving a configuration request message sent by an application terminal; and sending a configuration instruction to a configuration device, so that the configuration device sends configuration information to the application terminal through a working channel indicated by working channel information, where the configuration information is information required for the application terminal to set up a wireless network connection with the access point.

The information stored by the memory 603 includes the configuration instruction, used to instruct the configuration device to transmit configuration information to the application terminal, so that the application terminal can complete network configuration with the access point according to the configuration information.

The beacon frame includes the working channel information of the access point. The probe response frame includes the working channel information of the access point.

The response message is used to instruct the application terminal to receive, within the preset time, the configuration information sent by the configuration device.

Further, the processor 604 executes the following steps: sending a configuration request response message to the application terminal after receiving the configuration request message sent by the application terminal, and sending the working channel information and/or the configuration information to the configuration device through a wired connection.

Figure 8:
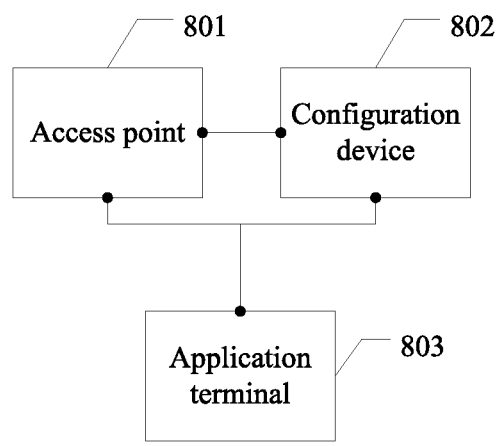
FIG. 8 is a schematic structural diagram of a system for configuring a wireless local area network device according to the present invention.

The following describes an embodiment of a system for configuring a wireless local area network device according to the present invention, where the system is used to execute the method for configuring a wireless local area network device. Referring to the logical structure shown in FIG. 8, the system for configuring a wireless local area network device in an embodiment of the present invention includes an access point 801, a configuration device 802, and an application terminal 803.

The access point 801 is configured to: receive a configuration request message sent by the application terminal 803; and send a configuration instruction to the configuration device according to the configuration request message, so that the configuration device 802 sends configuration information to the application terminal through a working channel indicated by working channel information, where the configuration information is used for the application terminal to perform network configuration with the access point, and the working channel information is working channel information of a wireless local area network where the access point is located which is obtained by the configuration device.

The configuration device 802 is configured to: obtain the working channel information of the wireless local area network, where the working channel information is used to indicate the working channel of the wireless local area network; receive, through the working channel according to the working channel information, the configuration instruction sent by the access point, where the configuration instruction is sent after the access point receives the configuration request of the application terminal, and the configuration instruction is used to instruct the configuration device to send the configuration information; and send the configuration information through the working channel information, so that the application terminal performs network configuration with the access point according to the configuration information.

For the specific operation procedure in the embodiments of the present invention, reference may be made to the method embodiments, and no repeated description is provided herein.

In the embodiments provided in the present application, it should be understood that the disclosed apparatuses and methods may be implemented through other modes. For example, the described apparatus embodiments are merely exemplary. For example, the unit division is merely logical function division and can be other division in actual implementation. For example, multiple units or components can be combined or integrated into another system, or some features can be ignored or not performed. In addition, the displayed or discussed mutual couplings or direct couplings or communication connections are implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on multiple network units. A part or all of the units may be selected according to the actual needs to achieve the objectives of the solutions of the embodiments.

In addition, functional units in the embodiments of the present invention may be integrated into a processing unit, or each of the units may exist alone physically, or two or more units are integrated into a unit. The integrated unit may be implemented in a form of hardware, or may be implemented in a form of a software functional unit.

When being implemented in the form of a software functional unit and sold or used as a separate product, the integrated unit may be stored in a computer-readable storage medium. Based on such understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, a network device, and the like) to execute all or a part of steps of the methods described in the embodiments of the present invention. The storage medium includes: any medium that can store program code, such as a USB flash drive, a removable hard disk, a read-only memory (ROM), a random access memory (RAM), a magnetic disk, or an optical disc.

The foregoing descriptions are merely exemplary embodiments of the present invention, but not intended to limit the protection scope of the present invention. Any variation or replacement made by persons skilled in the art without departing from the technical scope disclosed by the present invention shall fall within the protection scope of the present invention. Therefore, the protection scope of the present invention shall be subject to the appended claims.

What is claimed is:

1. A method for configuring a wireless local area network device, the method comprising:
   obtaining, by a configuration device, working channel information of a wireless local area network, wherein the working channel information is used to indicate a working channel of the wireless local area network, and obtaining the working channel information of the wireless local area network comprises:
      scanning, by the configuration device, a working channel of an access point to obtain the working channel information for communication between the access point and an application terminal; or
      receiving, through a wired interface, the working channel information for communication between the access point and the application terminal which is sent by the access point;
   receiving, by the configuration device through the working channel according to the working channel information, a configuration instruction sent by the access point, wherein the configuration instruction is sent by the access point in response to receiving a configuration request of the application terminal, and the configuration instruction is used to instruct the configuration device to send configuration information; and
   sending, by the configuration device, the configuration information through the working channel in response to receiving the configuration instruction, so that the application terminal performs network configuration with the access point according to the configuration information.

2. The method according to claim 1, wherein the wired interface comprises a universal serial bus (USB) interface.

3. The method according to claim 1, wherein scanning the working channel of the access point comprises:
   listening to a beacon frame of the access point, wherein the beacon frame comprises the working channel information of the access point; or
   sending a probe request frame to the access point and receiving a probe response frame returned by the access point, wherein the probe response frame comprises the working channel information of the access point.

4. The method according to claim 1, wherein the configuration information comprises:
   a configuration key, wherein the configuration key is used to enable the application terminal to obtain a credential from the access point for setting up a wireless network connection with the access point; or a credential for setting up a wireless network connection with the access point.

5. The method according to claim 1, wherein sending the configuration information through the working channel comprises sending the configuration information within a preset distance through the working channel.

6. The method according to claim 5, wherein sending the configuration information within the preset distance through the working channel information comprises sending the configuration information with secure power through the working channel, wherein the secure power ensures that an effective propagation distance of the configuration information sent by the configuration device is within the preset distance.

7. The method according to claim 5, wherein the preset distance is less than 10 meters.

8. The method according to claim 1, wherein the configuration instruction comprises configuration time information and wherein sending the configuration information through the working channel comprises sending the configuration information to the application terminal through the working channel within time indicated by the configuration time information.

9. The method according to claim 1, wherein the configuration instruction comprises address information of the application terminal and wherein sending the configuration information through the working channel comprises sending the configuration information to the application terminal corresponding to the address information through the working channel in a unicast mode.

10. A method for configuring a wireless local area network device, the method comprising:
receiving, by an access point, a configuration request message sent by an application terminal; and
sending, by the access point, a configuration instruction to a configuration device in response to receiving the configuration request message, so that the configuration device, in response to receiving the configuration instruction, sends configuration information to the application terminal through a working channel indicated by working channel information, wherein the configuration information is used for the application terminal to perform network configuration with the access point, wherein the working channel information is working channel information of a wireless local area network where the access point is located which is obtained by the configuration device, and wherein the configuration device obtains the working channel information by scanning a working channel of the access point to obtain the working channel information for communication between the access point and the application terminal, or by receiving, through a wired interface, the working channel information for communication between the access point and the application terminal which is sent by the access point.

11. The method according to claim 10, wherein after receiving the configuration request message sent by the application terminal, the method further comprises sending a configuration request response message to the application terminal, wherein the configuration request response message comprises configuration time information used to instruct the application terminal to receive, within time indicated by the configuration time information, the configuration information sent by the configuration device.

12. The method according to claim 10, wherein the configuration instruction comprises the configuration information.

13. The method according to claim 10, wherein after receiving the configuration request message sent by the application terminal, the method further comprises sending, by the access point, the working channel information and/or the configuration information to the configuration device through a wired connection.

14. The method according to claim 10, wherein the configuration instruction comprises:
configuration time information, used to instruct the configuration device to send the configuration information within a time indicated by the configuration time information; and/or
address information of the application terminal, used to instruct the configuration device to send the configuration information to the application terminal corresponding to the address information in unicast mode.

15. The method according to claim 10, wherein the configuration information comprises:
a configuration key, wherein the configuration key is used to enable the application terminal to obtain a credential from the access point for setting up a wireless network connection with the access point; or
a credential for setting up a wireless network connection with the access point.

16. A configuration device, comprising:
a receiver, configured to:
receive working channel information of a wireless local area network, wherein the working channel information is used to indicate a working channel of the wireless local area network, wherein receiving the working channel information of the wireless local area network comprises receiving, through a wired interface, the working channel information for communication between an access point and an application terminal which is sent by the access point; and
receive, through the working channel according to the working channel information, a configuration instruction sent by the access point, wherein the configuration instruction is sent by the access point in response to receiving a configuration request of the application terminal, and the configuration instruction is used to instruct the configuration device to send configuration information; and
a transmitter, configured to send, in response to receiving the configuration instruction, the configuration information through the working channel, so that the application terminal performs network configuration with the access point according to the configuration information.

17. The configuration device according to claim 16, wherein the transmitter is further configured to send the configuration information within a preset distance through the working channel.

18. The configuration device according to claim 16, wherein the transmitter is further configured to send the configuration information with secure power through the working channel information, wherein the secure power ensures that an effective propagation distance of the configuration information sent by the configuration device is within a preset distance.

19. A configuration device, comprising:
an input apparatus;
an output apparatus;
a memory; and
a processor program to execute the following steps:
obtaining working channel information of a wireless local area network, wherein the working channel information is used to indicate a working channel of the wireless local area network, wherein obtaining the working channel information of the wireless local area network comprises:
scanning a working channel of an access point to obtain the working channel information for communication between the access point and an application terminal; or
receiving, through a wired interface of the input apparatus, the working channel information for communication between the access point and the application terminal which is sent by the access point;
receiving, through the working channel according to the working channel information, a configuration instruction sent by the access point, wherein the configuration instruction is sent by the access point in response to receiving a configuration request of the application terminal, and the configuration instruction is used to instruct the configuration device to send configuration information; and
sending, in response to receiving the configuration instruction, the configuration information through the working channel, so that the application terminal performs network configuration with the access point according to the configuration information.

20. An access point, comprising:
a receiver, configured to receive a configuration request message sent by an application terminal; and
a transmitter, configured to send, in response to receiving the configuration request message, a configuration instruction to a configuration device, so that the configuration device sends configuration information to the application terminal through a working channel indicated by working channel information, wherein the configuration information is used for the application terminal to perform network configuration with the access point, and the working channel information is working channel information of a wireless local area network where the access point is located which is obtained by the configuration device, and wherein the configuration device obtains the working channel information by scanning a working channel of the access point to obtain the working channel information for communication between the access point and the application terminal, or by receiving, through a wired interface, the working channel information for communication between the access point and the application terminal which is sent by the access point.

21. The access point according to claim 20, wherein the transmitter is further configured to send a configuration request response message to the application terminal after receiving the configuration request message sent by the application terminal, wherein the configuration request response message comprises configuration time information used to instruct the application terminal to receive, within time indicated by the configuration time information, the configuration information sent by the configuration device.

22. The access point according to claim 20, wherein the transmitter is further configured to send the working channel information and/or the configuration information to the configuration device through a wired connection.

23. An access point, comprising:
an input apparatus;
an output apparatus;
a memory; and
a processor program to receive a configuration request message sent by an application terminal and send a configuration instruction to a configuration device in response to receiving the configuration request message, so that the configuration device sends, in response to receiving the configuration instruction, configuration information to the application terminal through a working channel indicated by working channel information, wherein the configuration information is used for the application terminal to perform network configuration with the access point, and the working channel information is working channel information of a wireless local area network where the access point is located which is obtained by the configuration device, and wherein the configuration device obtains the working channel information by scanning a working channel of the access point to obtain the working channel information for communication between the access point and the application terminal, or by receiving, through a wired interface, the working channel information for communication between the access point and the application terminal which is sent by the access point.

* * * * *